Dec. 29, 1953 W. D. APPEL 2,664,308
VEHICLE BODY CONSTRUCTION
Filed Aug. 25, 1951 2 Sheets-Sheet 1

W. D. APPEL
INVENTOR.

BY E. C. McRae
J. R. Faulkner
J. H. Oster

ATTORNEYS

Dec. 29, 1953  W. D. APPEL  2,664,308
VEHICLE BODY CONSTRUCTION
Filed Aug. 25, 1951  2 Sheets-Sheet 2

W.D. APPEL
INVENTOR.
BY E.C. McPee
J.R. Faulkner
D.H. Oster
ATTORNEYS

Patented Dec. 29, 1953

2,664,308

UNITED STATES PATENT OFFICE 2,664,308

VEHICLE BODY CONSTRUCTION

Walter D. Appel, Orchard Lake, Mich., assignor to Ford Motor Company, Dearborn, Mich., a corporation of Delaware Application August 25, 1951, Serial No. 243,615

2 Claims. (Cl. 296—28)

This invention relates to motor vehicle bodies, and more particularly to the front end structure of such bodies.

It is an object of the present invention to improve motor vehicle bodies and particularly bodies of the frameless or integral frame and body type. The invention contemplates the utilization of sheet metal side panels having their rearward edges conforming to and secured to the cowl structure and supported at their lower edges upon longitudinally extending sill members forming the under body structure of the integral frame and body unit. The side panels form the outer side walls of the engine compartment and also the inner walls of the front wheel houses. Reinforcing the front end of the vehicle body are a pair of elongated reinforcing members generally L-shaped in cross section and secured to the cowl structure, side panels and sill members in such manner as to form therewith box section ducts for the transmission of ventilating and heating air to the passenger compartment of the vehicle as well as providing a strong rigid structure properly supporting the forward portion of the vehicle body against the various stresses to which it is subjected. The reinforcing member at one side of the body is so constructed as to receive and support the core of a hot water heater in an advantageous position for maximum heating efficiency and located adjacent the engine so as to provide short connections thereto. The opposite reinforcing member and the adjacent side panel are formed and constructed in such manner as to provide a support for the vehicle battery as well as forming a ventilating duct and also properly strengthening and bracing the forward portion of the vehicle body structure.

The present invention accordingly has among its objects the provision of a strong, light weight, and easily and inexpensively manufactured construction for the forward portion of a motor vehicle body of the frameless or so-called integral frame and body type. A further object and advantage of the present construction is the provision of a vehicle body having desirable structural characteristics and at the same time performing functions ordinarily requiring additional structure and expense. Thus, with the present invention, heating and ventilating ducts are obtained without the necessity of providing structure for this purpose alone, and an effective battery support is formed in like fashion.

Other objects and advantages of this invention will be made more apparent as this description proceeds, particularly when considered in connection with the accompanying drawings, wherein.

Figure 1:
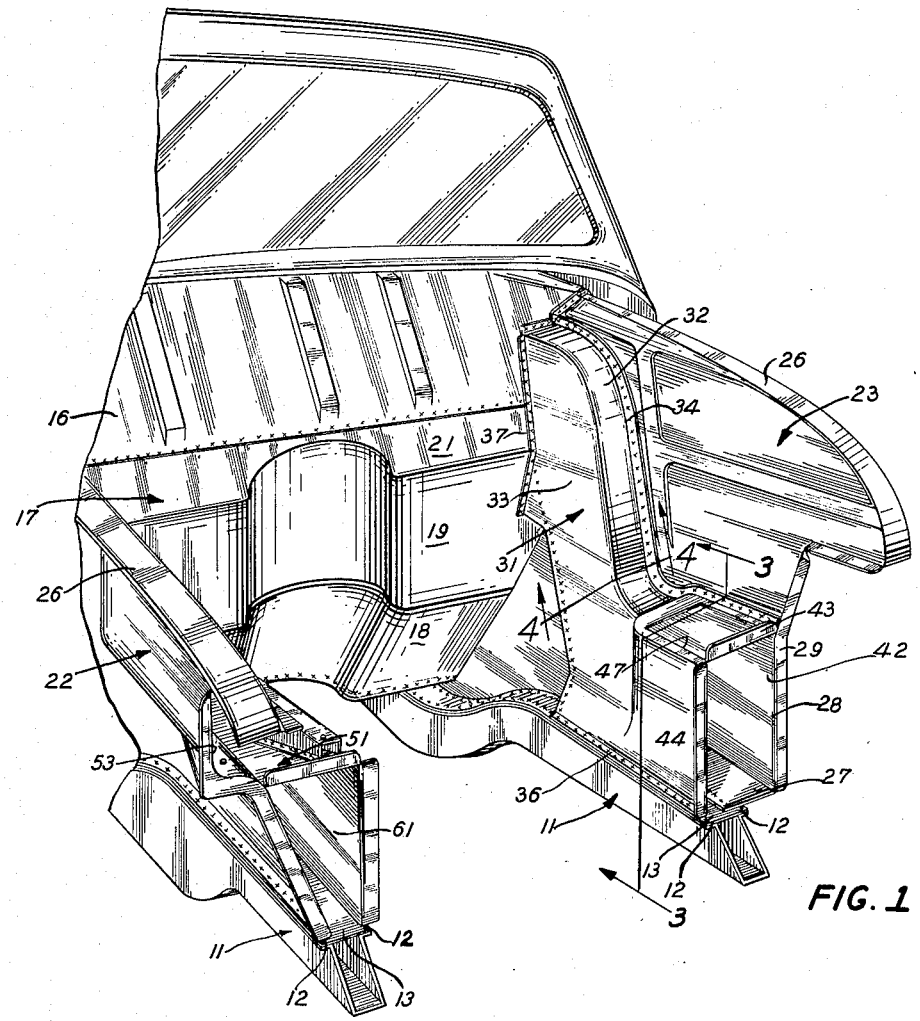
Figure 1 is a fragmentary perspective view of the forward portion of a motor vehicle body constructed in accordance with the present invention, and looking particularly toward the left side of the engine compartment of the vehicle.

Referring now to the drawings, the forward portion of the motor vehicle body is of the integral body and frame type with the under body framing structure comprising a pair of longitudinally extending U-shaped sill members 11 equally spaced on opposite sides of the longitudinal vertical middle plane of the body. The sill members 11 open upwardly and are provided with horizontal marginal flanges 12 to which are secured flat plates 13 closing the sill members and forming box section structures.

The cowl structure of the body comprises an upper cowl panel 16 and a lower shroud pan or dashboard 17. The dashboard 17 has a lower toeboard portion 18 supported upon the sill members 11 and inclined upwardly and forwardly therefrom. At its center the toeboard portion is depressed as in customary practice to provide clearance for other vehicle components. The inclined toeboard portion 18 continues upwardly into a generally vertical intermediate portion 19 also centrally depressed, and then continues into an upwardly and rearwardly inclined top portion 21 the upper edge of which is welded to the lower edge of the upper cowl panel 16 which forms a continuation thereof.

Right and left sheet metal side panels 22 and 23 are provided and form the outer side walls of the engine compartment and also the inner walls of the wheel houses for the front wheels of the vehicle. These side panels are, with certain exceptions to be discussed later, identical in construction and are so shaped at their rearward edges as to conform to the configuration of the cowl structure being welded thereto. The upper edges of the side panels 22 and 23 are provided with outwardly extending flanges 26 adapted to support and be secured to the outer side panels or fenders (not shown) of the body.

Figure 3:
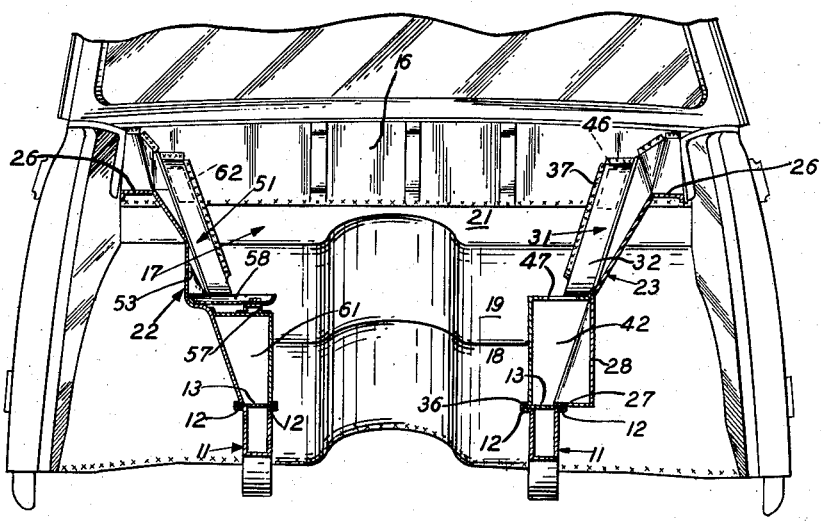
Figure 3 is a transverse vertical cross-sectional view of the structure shown in Figures 1 and 2, with the section being taken substantially on the plane indicated by the lines 3—3 of these views.

Since the construction varies somewhat at opposite sides of the vehicle, as indicated above, the construction at the two sides of the engine compartment will be described separately. The left front side, as best seen in Figures 1 and 3, will be described first. The left side panel 23 is inclined downwardly and inwardly toward the longitudinal center line of the vehicle and at its lower extremity is formed with an inwardly projecting flange 27 welded to the inner marginal flanges 12 and 13 of the adjacent sill member 11. Adjacent its forward edge, the left side panel 23 is bent to form a generally vertical portion 28. Adjacent this vertical portion 28 the lower flange 27 of the side panel is necessarily somewhat wider to extend to and be connected to the sill member 11. The forward edge of the side panel 23 is formed with an outwardly extending flange 29.

Reinforcing the left side structure thus far described is an elongated reinforcing member 31. The reinforcing member 31 is generally L-shaped in cross section to form an upper wall 32 and laterally inner wall 33. In side elevation the reinforcing member is somewhat S-shaped. The upper wall 32 of the reinforcing member is provided with a marginal flange 34 continuously engaging and welded to the adjacent surface of the left side panel 23. The forward portion of the inner wall 33 of the reinforcing member is formed at its lower edge with a marginal flange 36 seated upon and welded to the flat plate 13 and inner horizontal marginal flange 12 of the sill member 11. The rearward portion of the inner wall 33 of the reinforcing member is formed at its rearward edge with a marginal flange 37 conforming in shape to the configuration of the cowl structure and welded to the upper cowl panel 16 and the dashboard 17 of the cowl structure. It will be apparent from the foregoing that the reinforcing member 31 forms a compression strut or brace extending between the sill member and the cowl structure and is at the same time secured to the side panel to form a strong rigid body structure in this area.

Figure 4:
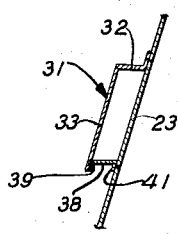
Figure 4 is a cross sectional view taken substantially on the plane indicated by the line 4—4 of Figure 1.

As best seen in Figure 4, the intermediate portion of the reinforcing member 31 between the forward portion connected to the sill member and the rearward portion connected to the cowl structure is further strengthened by means of a flanged plate 38 having one marginal flange 39 welded to the adjacent edge of the inner wall 33 of the reinforcing member and its opposite marginal flange 41 welded to the side panel 23. It will thus be seen that the flanged plate 38 not only provides additional support for the body structure but also closes the opening between the reinforcing member and the side panel. A completely enclosed hollow duct 42 is now formed between the reinforcing member 31, flanged plate 38, side panel 23, and sill member 11. The forward end of the duct is open and is adapted to receive air entering the vehicle through the grille (not shown). A suitable screen may be mounted if desired at the forward end of the duct 42 and secured to the front flange 29 of the side panel 23 and to flanges 43 and 44 formed at the forward edges of the reinforcing member 31. The rearward end of the duct 42 communicates with the passenger compartment of the vehicle through an opening 46, Figure 3, formed in the upper cowl panel 16 and dashboard 17 of the cowl structure.

It will be noted that the forward portion of the duct 42 is enlarged and of generally rectangular cross section by reason of the vertical front portion 28 of the side panel 23 and is thus adapted to receive the core of a suitable vehicle heater of the hot water type (not shown). A rectangular opening 47 is formed in the upper flange 32 of the reinforcing member 31 to enable a heater core to be inserted into the duct.

Thus, not only does the structure at the left front side of the vehicle provide a strong rigid integral body and frame structure with a minimum of parts and expensive construction but it also forms a duct adapted to receive air from adjacent the forward portion of the vehicle and transmit it to the passenger compartment thereof. Furthermore the body construction provides an advantageous location for a heater core to heat the incoming air immediately upon its entrance into the duct. In addition, the location thus provided for the heater core is closely adjacent the vehicle engine and accordingly relatively short connecting hose can be used. It will be seen that rearwardly of the forward enlarged portion of the duct 42 the duct is somewhat narrower and yet maintains a proper area for the transmission of air therethrough by reason of its vertical height.

Figure 2:
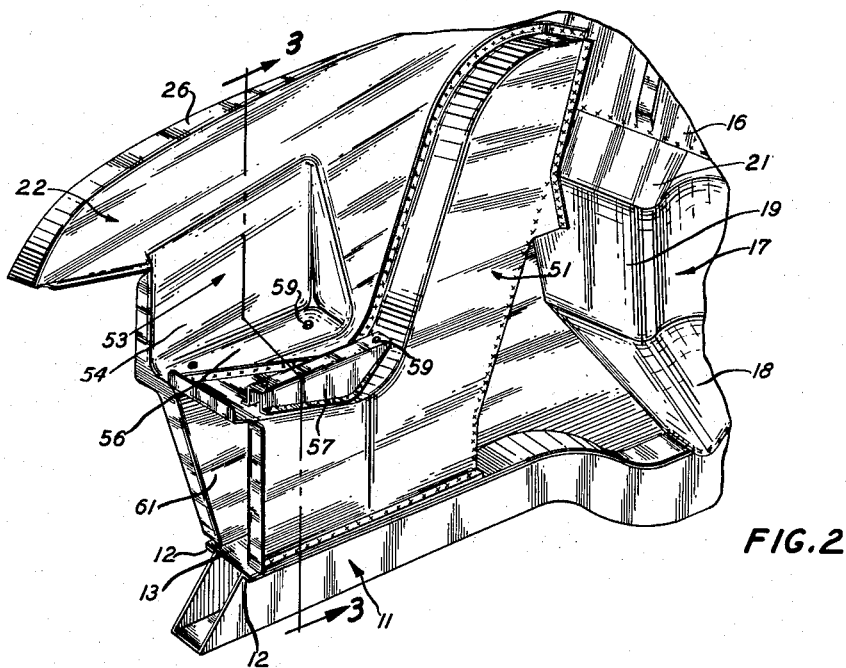
Figure 2 is a perspective fragmentary view of the construction shown in Figure 1, but looking particularly toward the right side of the engine compartment.

The construction at the right front portion of the vehicle body will now be described, and reference is made particularly to Figures 2 and 3. A reinforcing member 51 of L-shaped cross section and generally S-shaped in side elevation is provided and is generally the same as the opposite reinforcing member 31 except for being reversed. As with the left front reinforcing member 31, the right front reinforcing member 51 is provided with marginal flanges suitably welded to the right side panel 22, the upper cowl panel 16 and dashboard 17 of the cowl structure, and the laterally inner marginal flange 12 and plate 13 of the adjacent sill member 11. In addition, the portion of the reinforcing member 51 between the sill member and the cowl structure is supported and closed by means of a flanged plate similar to the flanged plate 38 at the opposite side of the vehicle body.

The right side panel 22 is also generally similar to the left side panel 23 and is formed with marginal flanges, the rearward and lower flanges being welded to the cowl structure and to the sill member respectively as at the opposite side of the body. The side panel 22, however, is not provided with a vertical portion at its forward extremity as in the case of the opposite side panel but is uniformly inclined downwardly and inwardly toward the longitudinal center line of the vehicle for maximum strength and support. In addition, the side panel 22 varies from the opposite side panel 23 by reason of being formed with a depressed portion 53 immediately above the top of the forward portion of the reinforcing member 51. The outer wall 54 of the depressed portion 53 of the side panel 22 is vertical while the lower wall 56 thereof is horizontal.

Welded to the upper surface of the forward portion of the reinforcing member 51 is an inverted channel-shaped member 57, the upper edge thereof being horizontal and aligned with the lower wall 56 of the depressed portion of the side panel. As seen in Figure 3, a flanged tray 58 is supported upon the channel-shaped member 57 and the lower wall 56 of the side panel and secured thereto by the bolts 59. The tray 58 is adapted to support the vehicle battery.

It will now be apparent that the reinforcing member 51 at the right front side of the vehicle body cooperates with the adjacent side panel 22, the flanged plate 51 and the sill member 11 to form a duct 61. The forward open end of the duct 61 is transversely aligned with the forward open end of the duct 42 at the opposite side of the body and is in position to receive ventilating air from adjacent the forward portion of the vehicle, preferably through the grill thereof. This ventilating air is connected through the duct and into the passenger compartment of the vehicle through an opening 62 formed in the upper cowl panel 16 and dashboard 17 of the cowl structure. Thus the body structure at the right front portion of the vehicle is not only efficiently designed to provide the necessary structural support in this area but also functions as ventilating and heating ducts and as a battery support.

It will be understood that the invention is not to be limited to the exact construction shown and described, but that various changes and modifications may be made without departing from the spirit and scope of the invention, as defined in the appended claims.

What is claimed is:

1. In a motor vehicle body construction, a transversely extending cowl structure, a pair of longitudinally extending sill members supporting said cowl structure and extending forwardly therefrom, said sill members being laterally spaced on opposite sides of the longitudinal center line of the vehicle body, a pair of sheet metal side panels defining the outer sides of an engine compartment and the inner sides of wheelhouses, said side panels being inclined downwardly and inwardly toward said longitudinal center line and having their rearward and lower edges conforming and secured to said cowl structure and sill members respectively, and a pair of reinforcing members of L-shaped cross section each having an upper leg secured at its marginal edge to the inner side of one of said side panels and an inner leg bridging the space between said cowl structure and the extended portion of one of said sill members and secured at its marginal edges thereto, a plate secured at its edges to said side panel and to the intermediate portion of the marginal edge of said inner panel of the reinforcing members, said reinforcing members, sill members, side panels, plates and cowl structure mutually bracing each other to form a unitary body structure and cooperating with each other to form enclosed ducts at opposite sides of the vehicle body for the transmission of heating and ventilating air from the front portion of the vehicle body to said cowl structure, and said cowl structure having a pair of openings formed therein in alignment with said ducts, the reinforcing member at one side of said vehicle body being formed with an opening in its upper leg at the forward portion thereof for the insertion therethrough of a heater element, and the adjacent inclined side panel being formed with a vertically extending portion at its forward end cooperating with said reinforcing member to form therewith an enlarged rectangular box section chamber for receiving a heater element.

2. In a motor vehicle body construction, a transversely extending cowl structure, a pair of longitudinally extending sill members supporting said cowl structure and extending forwardly therefrom, said sill members being laterally spaced on opposite sides of the longitudinal center line of the vehicle body, a pair of sheet metal side panels defining the outer sides of an engine compartment and the inner sides of wheelhouses, said side panels being inclined downwardly and inwardly toward said longitudinal center line and having their rearward and lower edges conforming and secured to said cowl structure and sill members respectively, and a pair of reinforcing members of L-shaped cross section each having an upper leg secured at its marginal edge to the inner side of one of said side panels and an inner leg bridging the space between said cowl structure and the extended portion of one of said sill members and secured at its marginal edges thereto, a plate secured at its edges to said side panel and to the intermediate portion of the marginal edge of said inner panel of the reinforcing members, said reinforcing members, sill members, side panels, plates and cowl structure mutually bracing each other to form a unitary body structure and cooperating with each other to form enclosed ducts at opposite sides of the vehicle body for the transmission of heating and ventilating air from the front portion of the vehicle body to said cowl structure, said cowl structure having a pair of openings formed therein in alignment with said ducts, the side panel at one side of said vehicle body being formed with an outwardly offset portion having a vertical wall and a horizontal floor, a supporting bracket mounted upon the top of the adjacent reinforcing member in transverse alignment with the offset portion of said last mentioned side panel and having its upper surface in horizontal alignment with the floor of said offset portion, and a battery supporting tray positioned upon said floor and said supporting bracket and secured thereto.

WALTER D. APPEL.

References Cited in the file of this patent

UNITED STATES PATENTS

| Number | Name | Date |
|---|---|---|
| 2,380,031 | Deisley et al. | July 10, 1945 |
| 2,388,419 | Komenda | Nov. 6, 1945 |
| 2,436,620 | Tarbox | Feb. 24, 1948 |